United States Patent
Chang et al.

(10) Patent No.: US 11,300,094 B1
(45) Date of Patent: Apr. 12, 2022

(54) HIGH EFFICIENCY COMPRESSED-AIR POWER GENERATION SYSTEM

(71) Applicants: Yu-Chieh Chang, Kaohsiung (TW); Hung-Sen Chang, Kaohsiung (TW); Yi-Hsuan Tsai, Kaohsiung (TW)

(72) Inventors: Yu-Chieh Chang, Kaohsiung (TW); Hung-Sen Chang, Kaohsiung (TW); Yi-Hsuan Tsai, Kaohsiung (TW)

( * ) Notice: Subject to any disclaimer, the term of this patent is extended or adjusted under 35 U.S.C. 154(b) by 0 days.

(21) Appl. No.: 17/149,774

(22) Filed: Jan. 15, 2021

(51) Int. Cl.
| | |
|---|---|
| *F03D 1/06* | (2006.01) |
| *F03D 80/60* | (2016.01) |
| *H02K 7/18* | (2006.01) |
| *H02K 5/18* | (2006.01) |

(52) U.S. Cl.
CPC ........... *F03D 1/0625* (2013.01); *F03D 80/60* (2016.05); *H02K 5/18* (2013.01); *H02K 7/1823* (2013.01); *F05B 2220/706* (2013.01); *F05B 2260/2241* (2013.01)

(58) Field of Classification Search
CPC ......... F03D 1/0625; F03D 80/60; H02K 5/18; H02K 7/1823; F05B 2220/706; F05B 2260/2241; F01D 15/10; F02C 1/02; F02C 1/002; F02C 1/005
See application file for complete search history.

(56) References Cited

U.S. PATENT DOCUMENTS

2014/0169957 A1* 6/2014 Kanjiyani ............... F01D 9/042
415/202

\* cited by examiner

*Primary Examiner* — Viet P Nguyen
(74) *Attorney, Agent, or Firm* — Bacon & Thomas, PLLC

(57) ABSTRACT

A high efficiency compressed-air power generation system has a main casing forming a main passage, a main rotor, an air distributor, and a main generator. The main passage has an intake section and a turbine section. The suction opening is connected to the intake section of the main passage, and the main outlet opening is connected to a turbine section of the main passage. The main rotor is rotatably mounted in the turbine section. The air distributor is configured to supply compressed air into the intake section via multiple nozzles directed toward the main turbine wheels. When compressed air is released from the air distributor, ambient air is sucked into the intake section by compressed air released by the air distributor utilizing Bernoulli's principle. The main rotor is rotated by a mixture of compressed air and ambient air to drive the main generator.

12 Claims, 6 Drawing Sheets

HIGH EFFICIENCY COMPRESSED-AIR POWER GENERATION SYSTEM

BACKGROUND OF THE INVENTION

1. Field of the Invention

The present invention relates to a power generation system, especially to power generation system that converts energy of compressed air into electric energy.

2. Description of the Prior Arts

A compressed-air power generation system converts energy stored in the compressed air directly into electric energy without generating greenhouse gas or other pollutants, thereby providing important flexibility for optimizing an eco-friendly energy system.

Blades in a turbine section of the generation system function as blades of a windmill. Mechanical energy of compressed air is extracted by the turbine section as the compressed air flow passes through the blades in the turbine section. The mechanical energy extracted by the turbine section can be converted into electric energy with ease.

The turbine section comprises multiple stages. Pressure and temperature of air flow in the turbine section is consumed and reduced as the air flow passes through each stage of the turbine section. External thermal energy, such as heat from hot water, is transferred to the air flow in the turbine section to restore the compressed air to ambient temperature, thereby partially restoring pressure of the air flow and increasing power generation efficacy.

However, in a conventional compressed-air power generation system, substance that carries external thermal energy needs to be isolated from air flow in the turbine section, thereby limiting heat transfer efficiency. As a result, power generation efficacy is also limited.

To overcome the shortcomings, the present invention provides a high efficiency compressed-air power generation system to mitigate or obviate the aforementioned problems.

SUMMARY OF THE INVENTION

The main objective of the present invention is to provide a high efficiency compressed-air power generation system by improving the efficiency of transferring heat into the main passage.

The compressed-air power generation system has a main generation unit having a main casing, a main rotor, an air distributor, and a main generator. The main casing forms an elongated main passage. The main passage has an intake section and a turbine section. The main casing has a suction opening and a main outlet opening each formed in a respective one of two opposite ends of the main casing. The suction opening is connected to the intake section of the main passage, and the main outlet opening is connected to the turbine section of the main passage. The main rotor is rotatably mounted in the turbine section of the main passage. The main rotor has a main shaft and multiple main turbine wheels. The main shaft is rotatably connected to the main casing. An imaginary straight line that is collinear with a centerline of the main shaft passes through the suction opening. The main turbine wheels are fixed to the main shaft of the main rotor and are arranged along a lengthwise direction of the main passage. The air distributor is disposed in the intake section of the main passage. The air distributor is configured to supply compressed air into the intake section and has multiple nozzles directed toward the main turbine wheels of the main rotor. The main generator is connected to the main shaft of the main rotor. When compressed air is released from the nozzles of the air distributor, ambient air is sucked into the intake section of the main passage via the suction opening such that the main rotor is rotated by a mixture of compressed air released from the nozzles and ambient air sucked into the intake section via the suction opening.

During operation, high pressure compressed air is released into the intake section of the main passage via the nozzles of the air distributor, forming a high speed air flow that flows toward the main turbine wheels and rotates the main rotor to generate electricity. Meanwhile, ambient air is sucked into the main passage via the suction opening because a low pressure area is formed in the intake section by the high speed air flow according to Bernoulli's principle.

The advantage of the present invention is that by forming the suction opening, ambient air can be sucked into the main passage to provide thermal energy for the air flow in the turbine section directly, thereby improving heat transfer efficiency and power generation efficacy.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
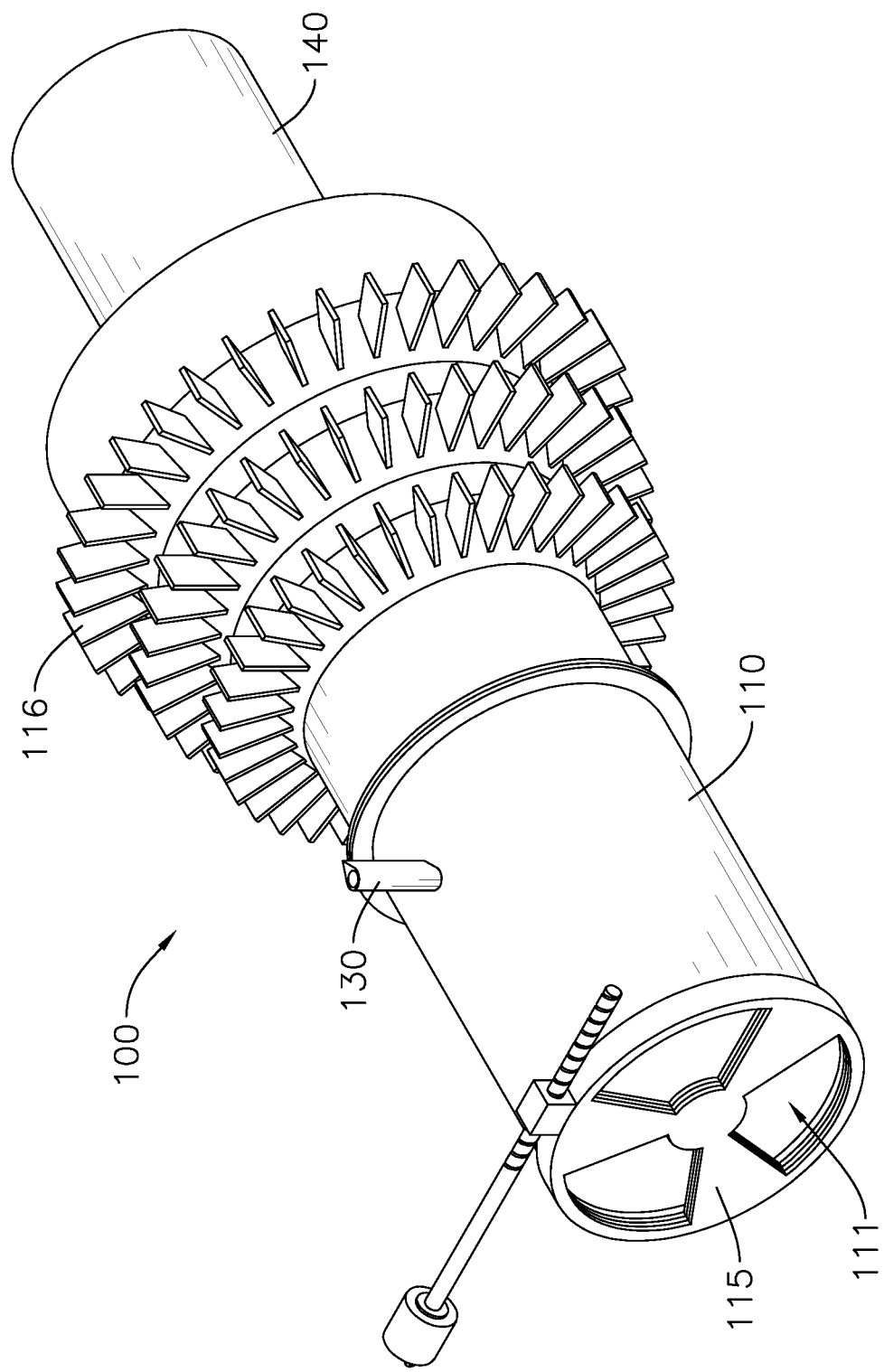
FIG. 1 is a perspective view of a high efficiency compressed-air power generation system in accordance with the present invention.
Figure 2:
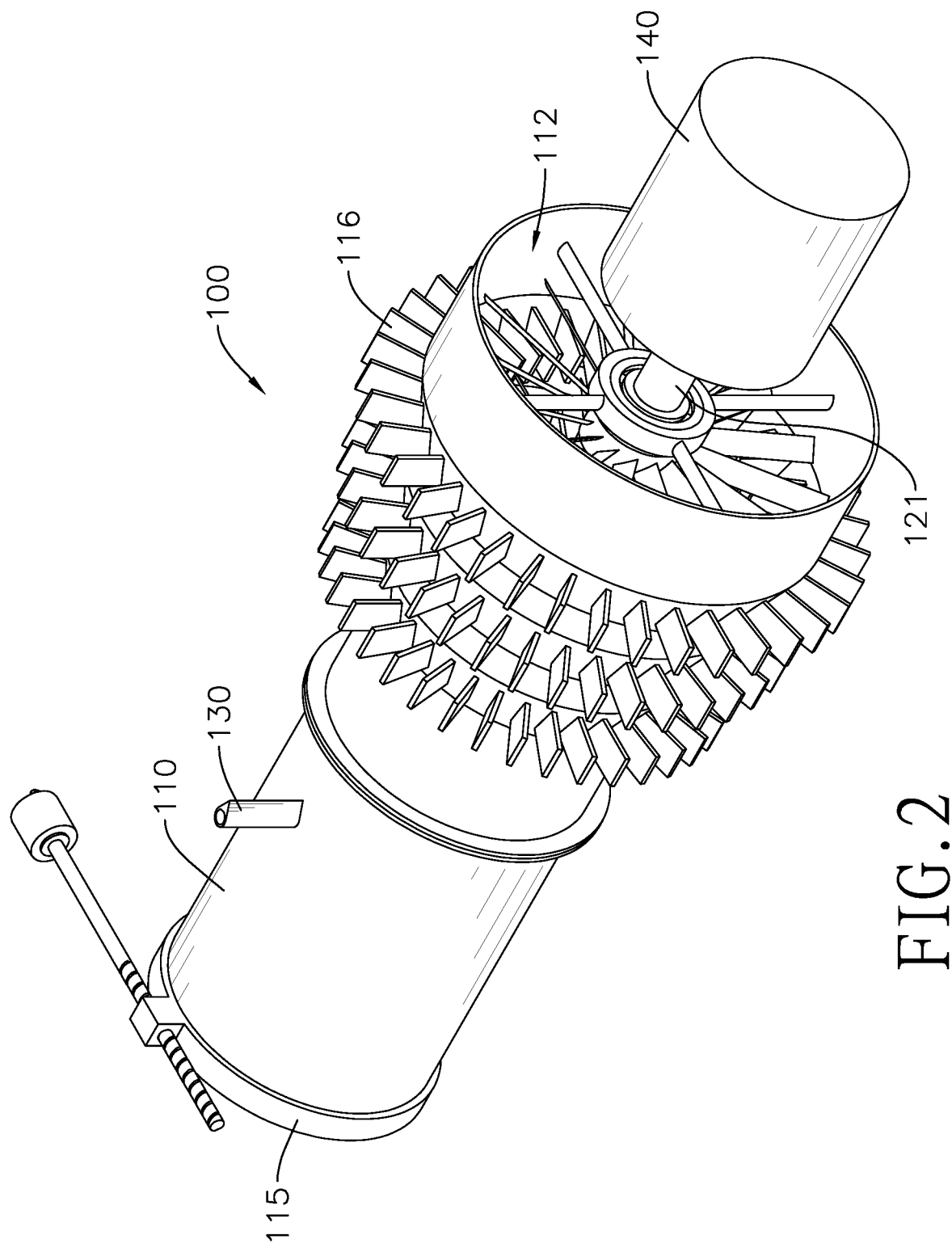
FIG. 2 is another perspective view of the compressed-air power generation system in FIG. 1.
Figure 3:
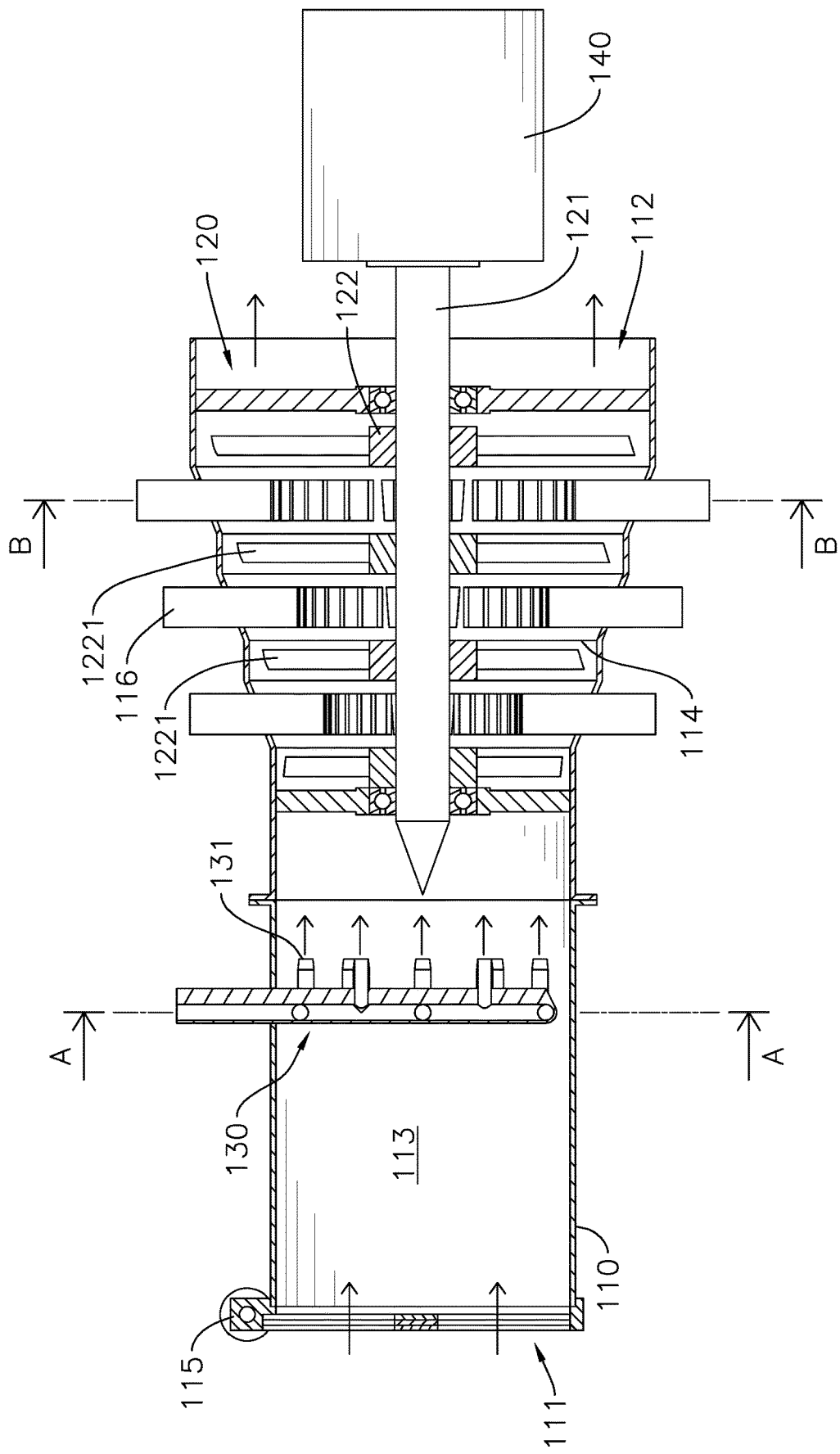
FIG. 3 is a longitudinal sectional view of the compressed-air power generation system in FIG. 1.

With reference to FIGS. 1 to 3, a first embodiment of a high efficiency compressed-air power generation system in accordance with the present invention comprises a main generation unit 100 having a main casing 110, a main rotor 120, an air distributor 130, and a main generator 140. In the preferred embodiment, the main generation unit 100 further has a suction valve 115 and multiple heat exchanging fins 116.

The main casing 110 forms an elongated main passage, and the main passage has an intake section 113 and a turbine section 114. A cross section of the turbine section 114 of the main generation unit 100 preferably increases toward a direction away from the intake section 113. The main casing 110 has a suction opening 111 and a main outlet opening 112 each formed in a respective one of two opposite ends of the main casing 110. The suction opening 111 is connected to the intake section 113 of the main passage, and the main outlet opening 112 is connected to the turbine section 114 of the main passage.

The main rotor 120 is rotatably mounted in the turbine section 114 of the main passage. The main rotor 120 has a main shaft 121 and multiple main turbine wheels 122. The main shaft 121 is rotatably connected to the main casing 110 by two bearings. The main turbine wheels 122 are fixed to the main shaft 121 of the main rotor 120 and arranged along a lengthwise direction of the main passage. Each one of the main turbine wheels 122 has a disk and multiple turbine blades 1221 mounted at the periphery of said disk.

The air distributor 130 is disposed in the intake section 113 of the main passage. The air distributor 130 is configured to supply compressed air into the intake section 113 and has multiple nozzles 131 directed toward the main turbine wheels 122 of the main rotor 120 such that compressed air released from the nozzles 131 can rotate the main rotor 120.

Figure 4:
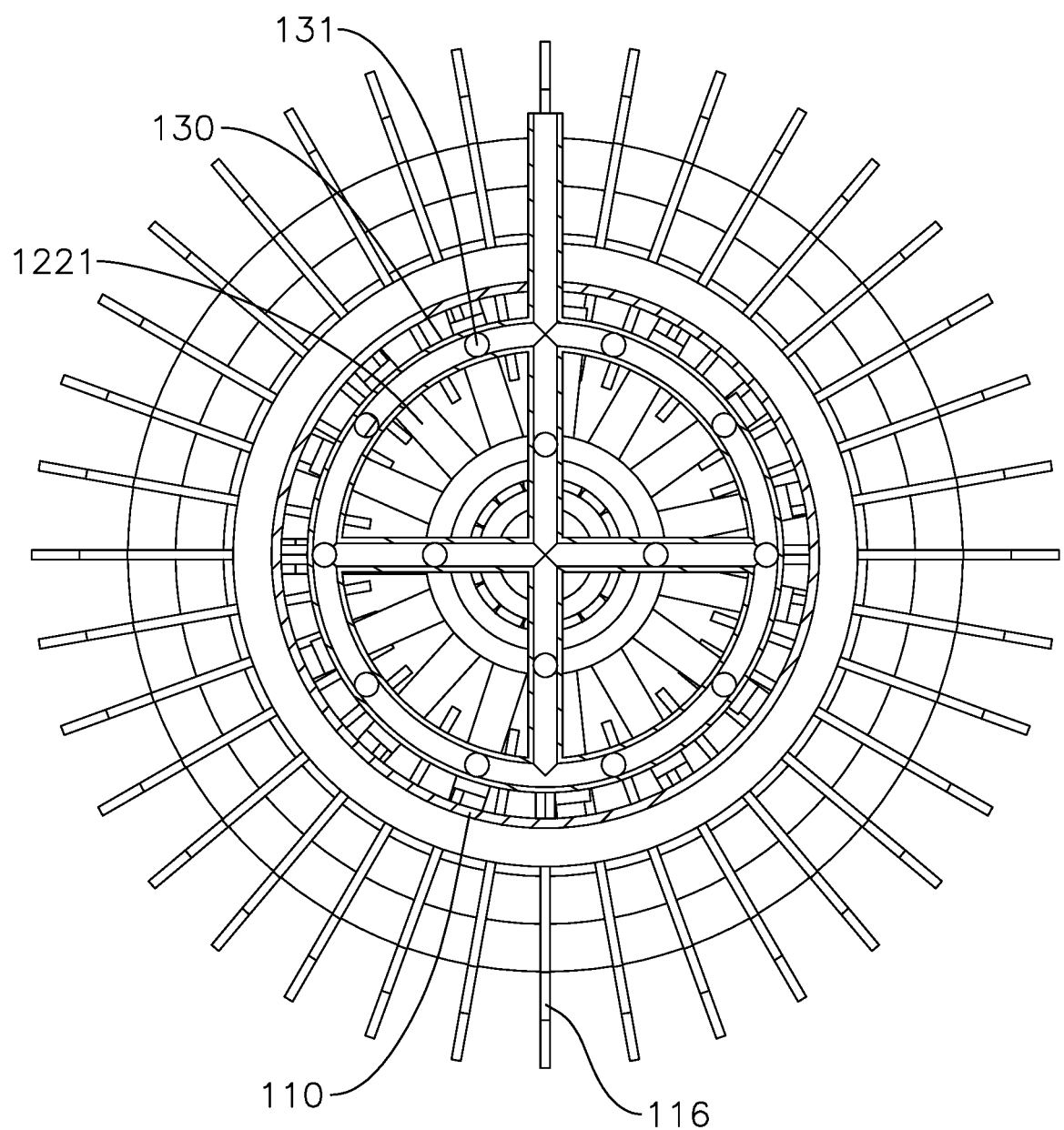
FIG. 4 is a cross sectional view of the compressed-air power generation system in FIG. 1, showing the compressed-air power generation system cut across a cutting plane line A-A in FIG. 3.

With reference to FIG. 3 and FIG. 4, in the preferred embodiment, openings of the nozzles 131 are coplanar and the nozzles 131 are disposed apart around an imaginary straight line that is collinear with a centerline of the main shaft 121 to reduce turbulence formed by the expanded compressed air leaving the nozzles 131. As a result, energy conversion efficiency is increased.

The main generator 140 is connected to the main shaft 121 of the main rotor 120.

During operation, high pressure compressed air is released into the intake section 113 of the main passage via the nozzles 131 of the air distributor 130, forming a high speed air flow that flows toward the main turbine wheels 122 and rotates the main rotor 120 to generate electricity. Meanwhile, ambient air is sucked into the main passage via the suction opening 111 because a low pressure area is formed in the intake section 113 by the high speed air flow according to Bernoulli's principle. Ambient air sucked into the main passage is mixed with the compressed air released into the intake section 113 and rotates the main rotor 120 together. Ambient air sucked into the main passage provides thermal energy for the air flow in the turbine section 114 directly, thereby improving heat transfer efficiency and improving power generation efficacy.

The suction valve 115 is mounted to the main casing 110 to adjust the air flow entering the main passage via the suction opening 111, and the suction valve 115 is preferably mounted over the suction opening 111 such that the suction valve 115 is able to seal the suction opening 111 when the compressed-air power generation system is not in operation.

Figure 5:
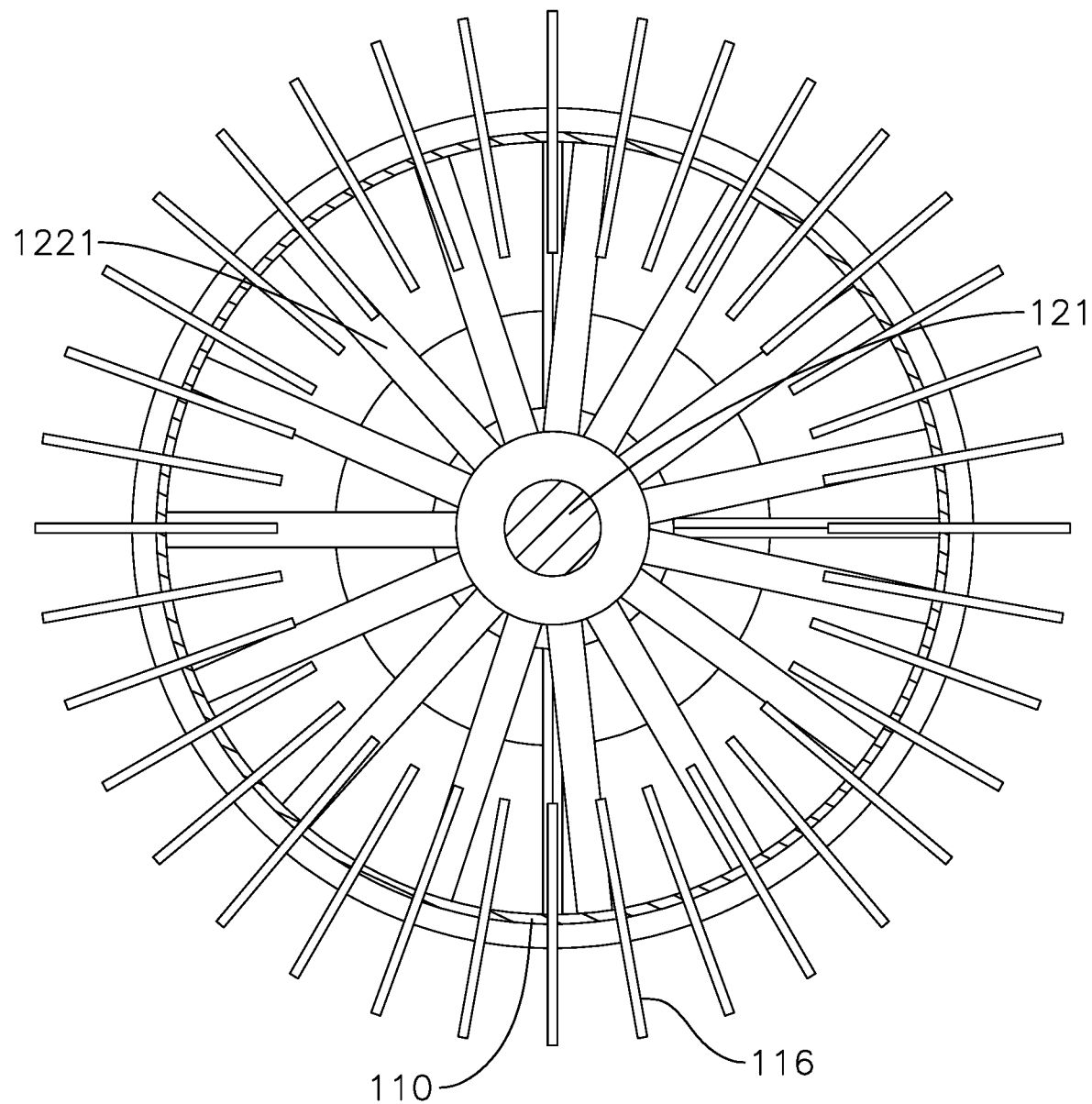
FIG. 5 is another cross sectional view of the compressed-air power generation system in FIG. 1, showing the compressed-air power generation system cut across a cutting plane line B-B in FIG. 3.

With reference to FIG. 3 and FIG. 5, the heat exchanging fins 116 are mounted through the main casing 110 and are disposed apart from each other around the main casing 110. The heat exchanging fins 116 of the main generation unit 100 correspond in position to the turbine section 114 of the main passage to increase the rate at which heat is transferred from surroundings into the turbine section 114.

To be precise, the heat exchanging fins 116 of the main generation unit 100 extend along radial directions of the main shaft 121 and are disposed between two adjacent ones of the main turbine wheels 122. An air flow inside the turbine section 114 absorbs heat from the heat exchanging fins 116 such that flow speed of said air flow can be further increased. Moreover, parts of the heat exchanging fins 116 that are protruded from an outer surface of the main casing 110 can be used for cooling down surrounding areas, electronic components or mechanical parts.

Figure 6:
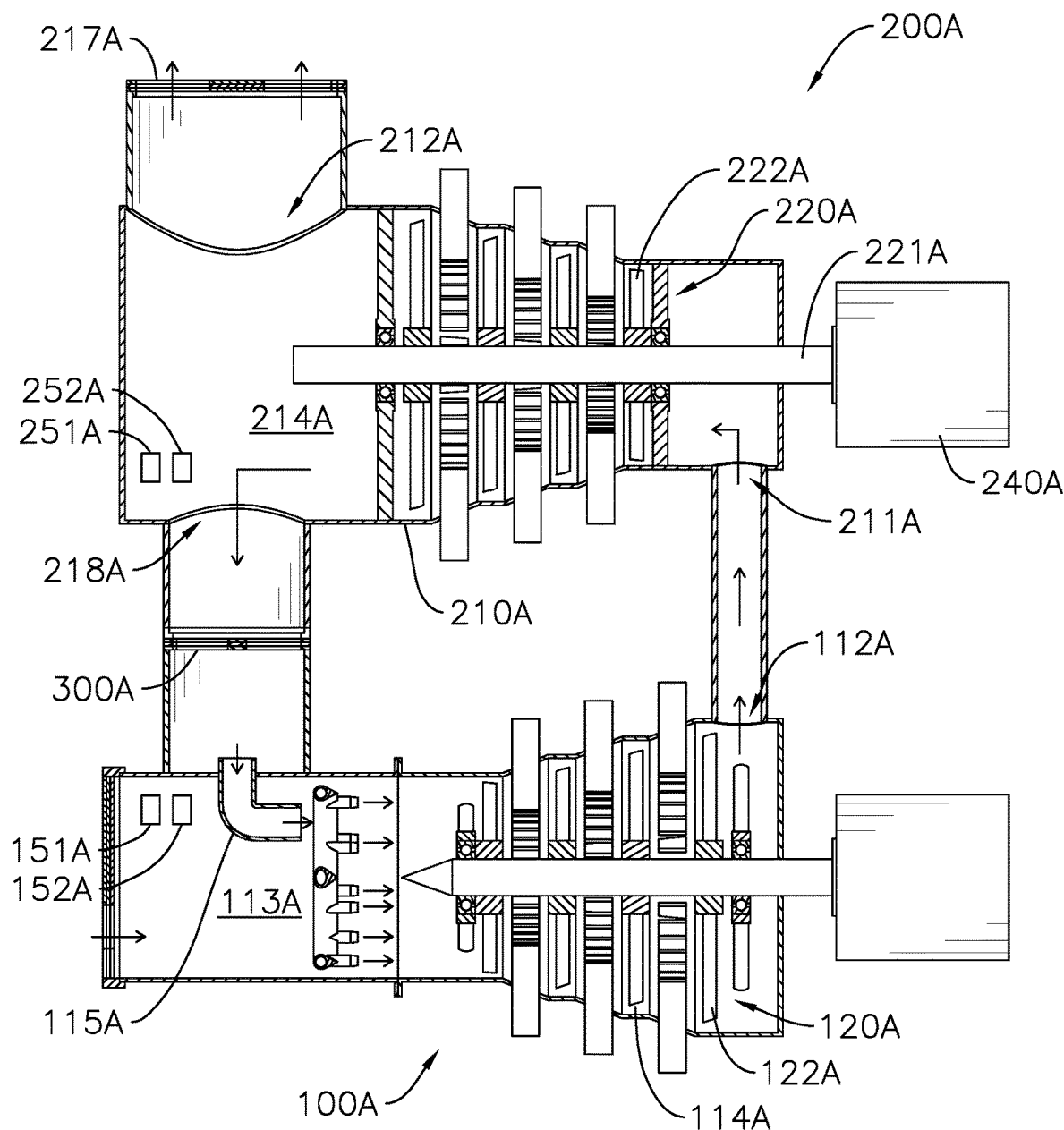
FIG. 6 is a sectional view of another high efficiency compressed-air power generation system in accordance with the present invention.

With reference to FIG. 6, a second embodiment of a high efficiency compressed-air power generation system in accordance with the present invention comprises a main generation unit 100A, an auxiliary generation unit 200A, and a back-feeding valve 300A.

The main generation unit 100A is substantially same as the main generation unit 100, but the main generation unit 100A further has a guiding tube 115A, an intake temperature sensor 151A, and an intake pressure sensor 152A. The intake temperature sensor 151A and the intake pressure sensor 152A are mounted in the intake section 113A of the main passage to measure temperature and pressure of the air flow in the intake section 113A.

The guiding tube 115A is disposed in the intake section 113A of the main passage. One of two ends of the guiding tube 115A protrudes from the intake section 113A to be in gaseous communication with the auxiliary generation unit 200A. The other end of the guiding tube 115A extends toward the main turbine wheels 122A of the main rotor 120A.

The auxiliary generation unit 200A has an auxiliary casing 210A, an auxiliary rotor 220A, an auxiliary generator 240A, an auxiliary temperature sensor 251A, an auxiliary pressure sensor 252A, and an outlet valve 217A.

The auxiliary casing 210A forms an elongated auxiliary passage 214A. Two opposite ends of the auxiliary casing 210A are respectively an inlet end and an outlet end. The auxiliary casing 210A has an inlet opening 211A and an auxiliary outlet opening 212A. In the preferred embodiment, the auxiliary casing 210A has, but not limited to, a back-feeding opening 218A.

The inlet opening 211A is formed in the inlet end of the auxiliary casing 210A and is connected to the auxiliary passage 214A. The inlet opening 211A is in gaseous communication with the main outlet opening 112A of the main generation unit 100A such that the air flows from the turbine section 114A of the main generation unit 100A to the auxiliary passage 214A of the auxiliary generation unit 200A via the inlet opening 211A.

The auxiliary outlet opening 212A and the back-feeding opening 218A are formed in the outlet end of the auxiliary casing 210A and are connected to the auxiliary passage 214A. The back-feeding opening 218A is in gaseous communication with the other end of the guiding tube 115A such that air in the auxiliary passage 214A can return to the intake section 113A of the main generation unit 100A via the guiding tube 115A.

The back-feeding valve 300A is connected between the back-feeding opening 218A of the auxiliary generation unit 200A and the intake section 113A of the main generation unit 100A to adjust air entering the intake section 113A via the back-feeding opening 218A.

The auxiliary rotor 220A is rotatably mounted in the auxiliary passage 214A. The auxiliary rotor 220A has an auxiliary shaft 221A and multiple auxiliary turbine wheels 222A. The auxiliary shaft 221A is rotatably connected to the auxiliary casing 210A. The auxiliary turbine wheels 222A are fixed to the auxiliary shaft 221A and are arranged along a lengthwise direction of the auxiliary passage 214A. The auxiliary turbine wheels 222A are configured to be rotated by air entering the auxiliary passage 214A via the inlet opening 211A.

The auxiliary generator 240A is connected to the auxiliary shaft 221A of the auxiliary rotor 220A.

The auxiliary temperature sensor 251A and the auxiliary pressure sensor 252A are mounted in the auxiliary passage 214A and located between the auxiliary rotor 220A and the auxiliary outlet opening 212A to measure temperature and pressure of air flow after passing through the auxiliary turbine wheels 222A.

The back-feeding valve 300A is connected between the back-feeding opening 218A of the auxiliary generation unit 200A and the intake section 113A of the main generation unit 100A to adjust the air flow entering the intake section 113A via the back-feeding opening 218A. The back-feeding valve 300A is electrically connected to the intake temperature sensor 151A, the intake pressure sensor 152A, the auxiliary temperature sensor 251A, and the auxiliary pressure sensor 252A to adjust status of the back-feeding valve 300A according to readings from the sensors.

The outlet valve 217A is mounted over the auxiliary outlet opening 212A and electrically connected to the back-feeding valve 300A to adjust the air flow leaving the auxiliary passage 214A via the auxiliary outlet opening 212A and the back-feeding opening 218A. The outlet valve 217A seals the auxiliary outlet opening 212A when the compressed-air power generation system is not in operation.

During operation, high pressure compressed air is released into the intake section 113A of the main generation unit 100A via the air distributor 130A and passes through the main turbine wheels 122A to drive the main generator 140 to generate electricity.

After passing through the main turbine wheels 122A, air enters the auxiliary passage 214A of the auxiliary generation unit 200A via the inlet opening 211A and rotates the auxiliary rotor 220A to drive the auxiliary generator 240A to generate electricity.

Status of the air after passing through the auxiliary rotor 220A is detected by the auxiliary temperature sensor 251A and the auxiliary pressure sensor 252A and compared with the air in the intake section 113A based on the readings from the intake temperature sensor 151A and the intake pressure sensor 152A. If the air passing through the auxiliary rotor 220A still has sufficient energy to be extracted, the back-feeding valve 300A allows said air to return to the intake section 113A of the main generation unit 100A via the guiding tube 115A. If the air after passing through the auxiliary rotor 220A is out of energy, said air leaves the auxiliary generation unit 200A via the auxiliary outlet opening 212A.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A compressed-air power generation system comprising a main generation unit; the main generation unit having:
   a main casing forming an elongated main passage; the main passage having an intake section and a turbine section; the main casing having
      a suction opening and a main outlet opening each formed in a respective one of two opposite ends of the main casing; the suction opening connected to the intake section of the main passage; the main outlet opening connected to the turbine section of the main passage;
   a main rotor rotatably mounted in the turbine section of the main passage; the main rotor having
      a main shaft rotatably connected to the main casing; wherein an imaginary straight line that is collinear with a centerline of the main shaft passes through the suction opening; and
      multiple main turbine wheels fixed to the main shaft of the main rotor and arranged along a lengthwise direction of the main passage;
   an air distributor disposed in the intake section of the main passage; the air distributor configured to supply compressed air into the intake section and having:
      multiple nozzles directed toward the main turbine wheels of the main rotor; and
   a main generator connected to the main shaft of the main rotor;
   wherein when compressed air is released from the nozzles of the air distributor, ambient air is sucked into the intake section of the main passage via the suction opening such that the main rotor is rotated by a mixture of compressed air released from the nozzles and ambient air sucked into the intake section via the suction opening.

2. The compressed-air power generation system as claimed in claim 1, wherein the main generation unit has a suction valve mounted to the main casing to adjust air flow entering the main passage via the suction opening.

3. The compressed-air power generation system as claimed in claim 2, wherein the suction valve is mounted over the suction opening and selectively seals the suction opening.

4. The compressed-air power generation system as claimed in claim 1, wherein the main generation unit has multiple heat exchanging fins mounted through the main casing and disposed apart from each other around the main casing; the heat exchanging fins of the main generation unit correspond in position to the turbine section of the main passage.

5. The compressed-air power generation system as claimed in claim 4, wherein the heat exchanging fins of the main generation unit are disposed between two adjacent ones of the main turbine wheels.

6. The compressed-air power generation system as claimed in claim 1, wherein openings of the nozzles are coplanar and the nozzles are disposed apart around the imaginary straight line that is collinear with a centerline of the main shaft.

7. The compressed-air power generation system as claimed in claim 1, wherein a cross section of the turbine section of the main generation unit increases toward a direction away from the intake section.

8. The compressed-air power generation system as claimed in claim 1 further comprising an auxiliary generation unit having:
   an auxiliary casing forming an elongated auxiliary passage; two opposite ends of the auxiliary casing being respectively an inlet end and an outlet end; the auxiliary casing having:
      an inlet opening formed in the inlet end and connected to the auxiliary passage; the inlet opening being in gaseous communication with the main outlet opening of the main generation unit such that the air flows from the turbine section of the main generation unit to the auxiliary passage of the auxiliary generation unit via the inlet opening;
      an auxiliary outlet opening formed in the outlet end and connected to the auxiliary passage;
   an auxiliary rotor rotatably mounted in the auxiliary passage; the auxiliary rotor having an auxiliary shaft rotatably connected to the auxiliary casing;

multiple auxiliary turbine wheels fixed to the auxiliary shaft of the auxiliary rotor and arranged along a lengthwise direction of the auxiliary passage; the auxiliary turbine wheels of the auxiliary rotor configured to be rotated by air entering the auxiliary passage via the inlet opening;

an auxiliary generator connected to the auxiliary shaft of the auxiliary rotor.

9. The compressed-air power generation system as claimed in claim 8, wherein the auxiliary casing of the auxiliary generation unit further has a back-feeding opening formed in the outlet end and connected to the auxiliary passage; and the main generation unit further has a guiding tube disposed in the intake section of the main passage; one of two ends of the guiding tube protruding from the intake section and being in gaseous communication with said back-feeding opening of the auxiliary generation unit; the other end of the guiding tube extending toward the main turbine wheels of the main rotor.

10. The compressed-air power generation system as claimed in claim 9, wherein the compressed-air power generation system further comprises a back-feeding valve; the back-feeding valve is connected between the back-feeding opening of the auxiliary generation unit and the intake section of the main generation unit to adjust air flow entering the intake section via the back-feeding opening;

the main generation unit further has an intake temperature sensor and an intake pressure sensor mounted in the intake section of the main passage and electrically connected to the back-feeding valve; and the auxiliary generation unit further has an auxiliary temperature sensor and an auxiliary pressure sensor mounted in the auxiliary passage of the auxiliary casing and located between the auxiliary rotor and the auxiliary outlet opening; the auxiliary temperature sensor and the auxiliary pressure sensor electrically connected to the back-feeding valve.

11. The compressed-air power generation system as claimed in claim 10, wherein the auxiliary generation unit has an outlet valve mounted over the auxiliary outlet opening and electrically connected to the back-feeding valve to adjust air flow leaving the auxiliary passage via the auxiliary outlet opening and the back-feeding opening; the outlet valve selectively seals the auxiliary outlet opening.

12. The compressed-air power generation system as claimed in claim 8, wherein the auxiliary generation unit has an outlet valve mounted over the auxiliary outlet opening to selectively seal the auxiliary outlet opening.

\* \* \* \* \*